United States Patent [19]
Kegelman

[11] 3,749,919
[45] July 31, 1973

[54] IMAGE CORRELATING DEVICE COMPRISING PLURAL PHOTOCONDUCTIVE LAYERS

[75] Inventor: Thomas D. Kegelman, Ridgefield, Conn.

[73] Assignee: United Aircraft Corporation, East Hartford, Conn.

[22] Filed: Nov. 1, 1971

[21] Appl. No.: 194,604

Related U.S. Application Data

[62] Division of Ser. No. 859,540, Sept. 19, 1969, Pat. No. 3,668,389.

[52] U.S. Cl. .............................. 250/213 R, 313/96
[51] Int. Cl. ............................................. H01j 39/06
[58] Field of Search ................... 313/94, 95, 96, 97, 313/101; 250/211 R, 211 J, 213 R

[56] References Cited
UNITED STATES PATENTS

| 3,439,174 | 4/1969 | Snaper | 250/213 |
|---|---|---|---|
| 3,449,583 | 6/1969 | Eden | 250/213 |
| 2,447,344 | 8/1948 | Kliever | 250/203 |
| 3,028,499 | 4/1962 | Farrall | 250/209 |
| 3,213,282 | 10/1965 | Brouwer | 250/209 |
| 3,263,101 | 7/1966 | Gier | 313/94 |

Primary Examiner—James W. Lawrence
Assistant Examiner—D. C. Nelms
Attorney—Melvin Pearson Williams

[57] ABSTRACT

My invention relates to an image correlating device for determining the identity between two images and more particularly to a device which provides a measure of the correlation or lack of it between two images being compared.

1 Claim, 6 Drawing Figures

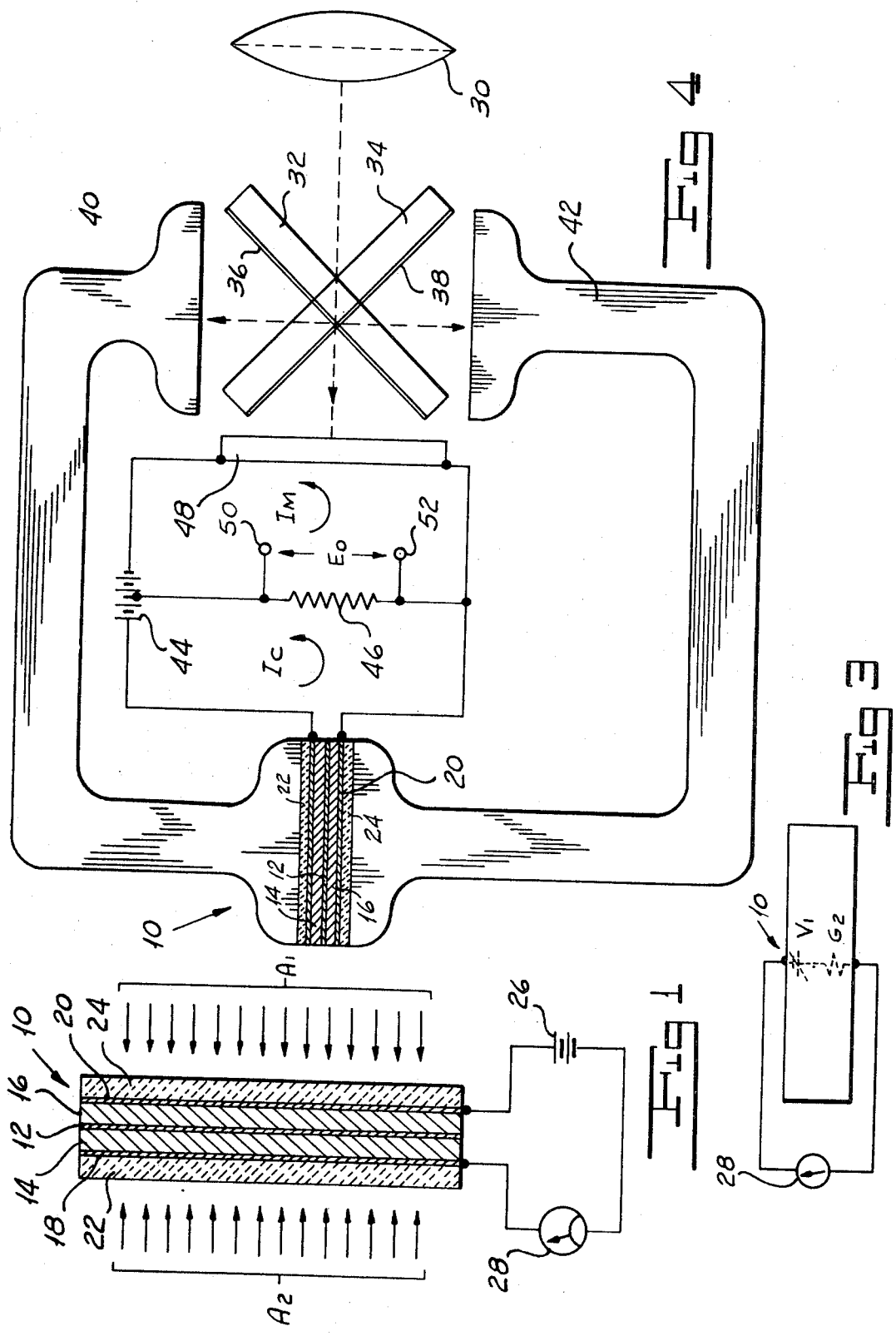

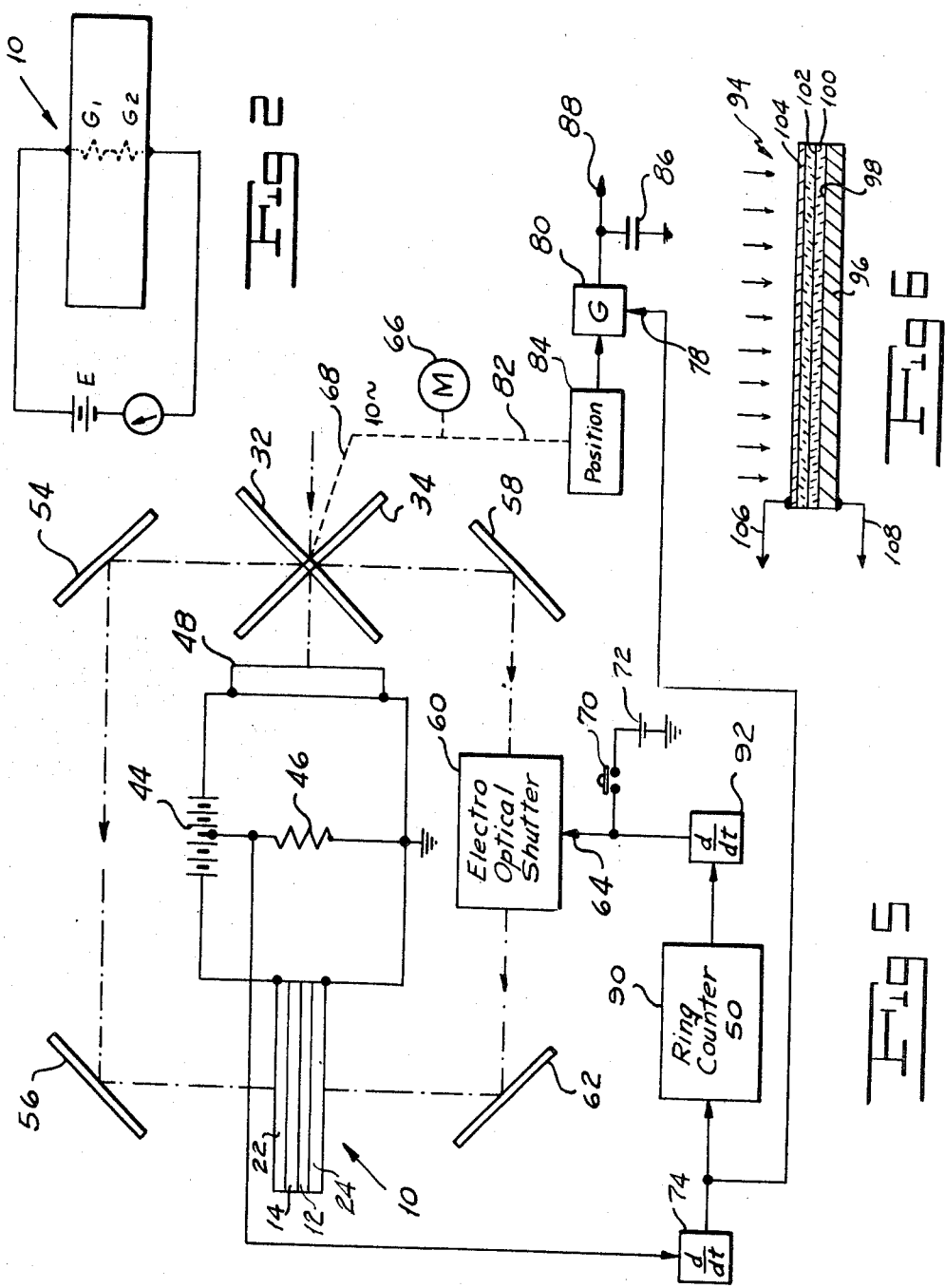

IMAGE CORRELATING DEVICE COMPRISING PLURAL PHOTOCONDUCTIVE LAYERS

This is a division of application Ser. No. 859,540, filed Sept. 19, 1969 now U.S. Pat. No. 3,668,389.

In general my invention contemplates the provision of an image correlating device comprising a layer of opaque material providing a low resistance path through the layer and a relatively high resistance path in a direction transverse of the layer, sandwiched between two photoresponsive layers on which the images to be correlated are focused. My device provides an output current which is a measure of the correlation between the images.

BACKGROUND OF THE INVENTION

There are many instances wherein it is necessary or desirable to compare two images to determine the correlation therebetween. For example, a stored photograph might be compared with a surveyed scene in a radar map matcher or in an optical map matcher. Image correlation systems might also be employed to examine rocket plumes to determine whether or not there has been a change in the spectral character of the scene. Image correlators can also be used either to detect motion or to permit a moving object to be tracked.

Image comparing systems known to the art employ relatively complicated optical systems. They do not generally provide any signal output which can be used as a measure of correlation between the two images or the deviation of one image from the other.

DESCRIPTION OF THE INVENTION

I have invented an image correlating system which provides an output current which is a measure of the correlation between two images being compared. My system is relatively simple and rugged for the result achieved thereby. It permits a direct comparison of two images being examined. It is adapted for use as a correlating device to detect motion, to track a moving image or to determine spectral changes in the radiation characteristic of a scene.

One object of my invention is to provide an image correlating device which produces a signal indicating the correlation between two images being compared.

Another object of my invention is to provide an image correlating device which is optically simple and rugged.

A further object of my invention is to provide an image correlating device which is versatile in its application.

Other and further objects of my invention will appear from the following description.

In the accompanying drawings which form part of the instant specification and which are to be read in conjunction therewith and in which like reference numerals are used to indicate like parts in the various views:

FIG. 1 is a schematic view of one form of my image correlating device.

FIG. 2 is a schematic view illustrating the mode of operation of one form of my image correlating device.

FIG. 3 is a schematic view illustrating the mode of operation of another form of my image correlating device.

FIG. 4 is a diagrammatic view of a system incorporating my image correlating device.

FIG. 5 is a diagrammatic view of another system incorporating my image correlator.

FIG. 6 is a schematic view of another form of my image correlating device.

My image correlating device produces an output current which is a measure of the correlation coefficient C of two variables $A_1$ and $A_2$ which are the elemental brightnesses of the images being compared. As is known in the art, the correlation coefficient C is expressed by the relationship $$(1) \quad C = (\Sigma[(A_1 - M_1)(A_2 - M_2)]/\sigma_1 \sigma_2)$$

where
$M_1$ is the mean value of $A_1$
$M_2$ is the mean value of $A_2$
$\sigma_1$ is the standard deviation of $A_1$
and
$\sigma_2$ is the standard deviation of $A_2$.

The numerator of Equation (1) above is the covariance of $A_1, A_2$ determined by taking the mean of the product of the functions with the means being subtracted from the functions before the products are made. It can readily be demonstrated that Equation (1) can be rewritten as $$(2) \quad C = (\Sigma(A_1 A_2) - M_1 M_2/\sigma_1 \sigma_2)$$

As will be explained hereinbelow, I so arrange my image correlation device as to provide a current representing Equation (2).

Referring now to FIG. 1 of the drawings, one form of my device indicated generally by the reference character 10 includes a layer 12 of an opaque material having the characteristic of providing a relatively low resistance therethrough and a relatively high resistance transverse to the layer. Layer 12 has an anisotropic conductance characteristic owing to the geometry thereof. It is formed as a thin film the surface of one of two bodies 14 and 16 of photoresponsive material between which it is sandwiched. It may, for example, be a one-tenth of a mil thick graphite film formed by floating "Aquadag" on the surface and evaporating the liquid. "Aquadag" is the registered trademark of Acheson Colloids Co. for a concentrated colloidal dispersion of pure electric-furnace graphite in water. Alternatively, film 12 may be formed by evaporating a very thin layer of about 0.001 mil thickness of gold or aluminum on the body.

Layers 14 and 16 carry thin conductive transparent films 18 and 20. Preferably I cover layers 18 and 20 with glass layers 22 and 24. By way of exposition, I have indicated the images to be compared by groups of arrows $A_1$ and $A_2$ directed toward the outer surfaces of the glass layers 22 and 24.

In one form of my image correlating device I may form the photoresponsive layers 14 and 16 from a suitable photoconductive material. As will be explained more fully hereinafter, in some uses layers 14 and 16 may be made of the same material while in other applications they may be made of materials differing in a certain characteristic. I may use long persistence materials such as cadmium sulfide, cadmium selenide and the long persistence form of antimony trisulfide, as well as short persistence materials such as lead sulfide and the short persistence form of antimony trisulfide. Any suitable materials known to the art may, of course, be employed. As is known in the art, photoconductive materials of this type change their resistance directly as a result of photon absorption. Where the two layers 14 and 16 are formed from photoconductive material, I connect a battery 26 and a meter 28 across the two conductive films 18 and 20.

Considering a small section of the sandwich, the conductance therethrough is proportional to the sum of the intensities of the two images at the point under examination or, as indicated in FIG. 2, the section can be considered as two series-connected conductances $G_1$ and $G_2$. If the images are identical and if they are in perfect registration, the output current of the device is a maximum. If, however, the images are displaced, the sum of the incremental currents decreases. Owing to the fact that the conductance through the device is two conductances in series, which conductances are measures of the brightness of the respective images, the output current will be of the form $(A_1 A_2/A_1 + A_2)$. By comparison of this expression with Equation (2), it will be seen that it is not directly suitable for a calculation although it does provide an approximate measure of correlation.

I have discovered that an output current of a more useful form may be provided by making one of the layers 14 or 16 a photovoltaic cell such, for example, as one which is formed by the junction of a metal and a semiconductor. I may employ a back wall photovoltaic cell or a copper oxide photovoltaic cell. When that arrangement is used as indicated in FIG. 3, the equivalent circuit is a variable voltage source $V_1$ in series with a conductance $G_2$ so that the output current is expressed by $V_1 G_2 = \Sigma(A_1 A_2)$. Again, by reference to Equation (2) it will be seen that this form of the device provides an output current which can be directly employed.

The form of my image correlation system thus far described is useful in comparing any two images directly, as in a map matching system. My device also is useful in a system for comparing a long persistence image with a short persistence image to determine motion in the scene from which the images are derived. In such an installation I select the two detectors to provide surfaces having different time constants. Referring to FIG. 4 I have shown one arrangement wherein the same image is applied to the two surfaces of the detector 10 to detect motion in the scene. I have discovered that the autocorrelation in such an arrangement is appreciably improved by optically scrambling the image. When that is done, dark and light areas are immediately adjacent so that minor perturbations in the optical field result in major perturbations of the autocorrelation function. Specifically, a lens 30 transmits the image to a device comprising a pair of glass plates 32 and 34, the backs of which are lightly silvered as indicated at 36 and 38 so as to provide a first image passing through the plates 32 and 34, a second image reflected upwardly toward a first optical scrambler 40 and a third image reflected downwardly into a second optical scrambler 42. The two scramblers 40 and 42 may be constructed as fiber optics image scramblers which present identically scrambled images to the two sides of the correlating device. As has been explained hereinabove, in this arrangement the two layers 14 and 16 may provide surfaces having different time constants. Alternatively, they may have different spectral sensitivities to permit detection of a change in the spectral character of the radiation characteristic of the scene.

I connect the two conductive films 18 and 20 respectively to one terminal of a battery 44 and to a terminal of an output resistor 46, the other terminal of which is connected to a center tap on the battery 44. An average intensity detector 48 formed of a suitable photoconductive material is connected between the other battery terminal and that terminal of resistor 46 to which the film 20 is connected. Under these conditions the device will produce a correlation current $I_c$ which is proportional to $\Sigma (A_1, A_2)$. The other branch of the circuit carries a current $I_m$ which is proportional to $M_1 M_2$. Owing to the fact that the fiber scrambler provides identically scrambled images, the standard deviations $\sigma_1, \sigma_2$ are the same and are constant. As a result there is produced across resistor 46 between output terminals 50 and 52 an output voltage $E_o$ representing Equation (2) above. It will thus be clear that I have provided an output signal which is a measure of the correlation co-efficient between two images derived from the same scene. Where materials providing different time constants are used motion may be detected. If materials having different spectral responses are used, changes in the spectral characteristics of the scene can be detected.

Referring now to FIG. 5, I have shown another system incorporating my image correlating device, which system can be used to direct a steerable object toward a target. In the arrangement shown the image of the target is directed toward the two plates 32 and 34, which permit the image to impinge on the average detector 48 which forms part of the circuit including battery 44, resistor 46 and the correlating device 10. As in the system shown in FIG. 4, the plates 32 and 34 also reflect a target image in both an upward and a downward direction as viewed in FIG. 5. In the system shown in that Figure, however, I do not employ the scramblers 40 and 42 but provide a first pair of reflectors 54 and 56 which direct one of the images to the surface of one of the bodies 14 and 16. As will be apparent from the description hereinafter, bodies 14 and 16 are selected so that one of the two has a relatively high persistence while the other of the two responds very nearly instantaneously to changes in the image.

In the arrangement of FIG. 5, the body on which the image is directed by the mirror 56 may be the low persistence, rapid response body. Another reflector 58 directs the other reflected image through an electro-optical shutter 60 to a reflector 62 which directs the image onto the surface of the high persistence body. The shutter 60 may be of any suitable type known to the art such, for example, as that shown and described on page 604 of "FUNDAMENTALS OF OPTICS" (3rd Edition 1957) by Jenkins and White, published by McGraw-Hill Book Company, Inc., New York, N.Y. As is described in that publication, shutter 60 normally blocks the passage of light therethrough. In response to the presence of voltage at an input terminal 64, an electric field is produced which causes the shutter to pass light for the duration of the signal.

In the arrangement shown in FIG. 5, I oscillate the image on the relatively low persistence path in order to generate a signal indicating the deviation of the boresight of the system from the target. A motor 66 drives a linkage 68, indicated schematically by a broken line, to oscillate the plates 32 and 34 at a rate of about 10 cycles per second, for example. When the operator of the system has visually lined up the system optical axis with the target, he actuates a pushbutton 70 to apply potential from a source 72 to shutter 60 to cause the image to be applied to the high persistence body of the correlator 10. In the course of each oscillation of the plates 32 and 34, the image of the low persistence body will register with the stored image on the high persistence body to cause a peak of output voltage on resistor 46. I apply this peak output voltage to a differentiating circuit 74 to provide a pulse input to the control terminal 78 of a gating circuit 80.

Motor 66 also drives the input linkage 82 of a position signal generator 84 which provides an input signal to gate 80. Thus, each time the images register, the position generator signal passes through gate 80 to a storage device 86 connected to the vehicle control system input terminal 88. The position signal thus provides an indication of the angular position of the system axis at which the images are in registry.

I also apply the output pulse from differentiator 76 to a ring counter 90 which may count to 50, by way of example, at which time it puts out a signal which is applied by a differentiating network 92 to the control terminal 64 of the shutter 60. Thus, after each 50 cycles, the target image is again applied to the low persistence element of the device 10 to maintain the target image thereon.

Referring to FIG. 6 an alternate embodiment of my correlating device, indicated generally by the reference character 94 includes a metal plate 96 having a highly-polished lustrous surface 98. I vapor deposit superposed thin substantially transparent films 100 and 102 on the surface 98. I select the materials forming the films to differ in a particular characteristic. If film 100 has a high persistence or long time constant, then film 102 has a low persistence or short time constant. I evaporate a thin transparent conductive coating 104 on the layer 102. This may be achieved by evaporating a suitable material such as tin oxide, gold or the like onto the film 102. Conductors 106 and 108 provide connections to the external circuit. This form of my device is useful in both of the systems shown in FIGS. 4 and 5.

In operation of the form of my device illustrated in FIG. 1, two images from different sources may be focused on the surfaces of bodies 22 and 24. One of the images may be the scene as viewed by a radar or optical system while the other image may be a stored image in the form of a photograph or the like. In such a system, a maximum current flow in the output circuit as indicated by the meter 28, for example, signals that the two images are correlated. The amount by which the output current departs from the maximum indicates the degree in which the images are out of correlation. As has been explained hereinabove, in my device I may make both layers 14 and 16 of a photoconductive material. With that arrangement, however, the output current is not in as useful a form as is desired, although it does provide some measure of correlation. To improve the form of the current, I may make one of the bodies 14 or 16 a photovoltaic cell which generates a potential in response to absorption of photons. The resultant output then is a more accurate indication of correlation.

In operation of the form of my invention shown in FIG. 4, to detect motion, for example, an image from the scene is reflected into the identical optical scramblers 40 and 42 and, as scrambled by these devices, is applied to the opposite sides of the correlation device 10. Where I wish to determine motion in the scene, one of the bodies 14 or 16 is so selected as to have a higher persistence surface than does the other of the bodies. When there is no motion in the scene, the current $I_o$ will be a maximum. Upon the occurrence of motion in the scene, the effect on the shorter persistence surface changes before that on the higher persistence surface, with the result that the images apparently are not correlated and the current $I_c$ is reduced. The devices 32 and 34 also transmit an image of the scene to the average detector 48 to generate a current therethrough $I_m$ which is a measure of the average brightness of the scene. Under these conditions, resistor 46 provides an output voltage $E_o$ which is a measure of the correlation co-efficient.

In the arrangement of FIG. 2, the fiber optics scramblers permit development of a precise autocorrelation function in a scene which is fairly uniform. The scramblers provide dark and light areas at the correlator 10, which areas are immediately adjacent. Thus, minor disturbances in the optical field result in major changes in the output signal.

The system of FIG. 2 may also be employed to examine phenomenon such as changes in the spectral character of a rocket plume. In such an application of my autocorrelation device, I select the bodies 14 and 16 to have different spectral responses. Thus, a change in color of the plume results in a change in the signal $E_o$ owing to the difference in response of the two bodies 14 and 16.

The system shown in FIG. 5 permits tracking of a target by use of the output voltage $E_o$. The mechanically induced optical deviation produced by linkage 68 creates an oscillating image which registers with the stored image once each cycle. When that occurs the position signal of circuit 84 passes to terminal 88.

It will be seen that I have accomplished the objects of my invention. I have provided a correlation device which produces a signal indicating the correlation between images being compared. It is optically simple and relatively rugged as contrasted with image comparing systems of the prior art. It is versatile in its application, permitting static comparison of a stored image with a scene for matching, detection of motion in a scene, detection of change in the spectral character of a scene, and tracking of targets.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A photo electric assembly, adapted for connection in an image correlating system including a source of electrical potential and current measuring means, comprising:

a plurality of layers each having opposed first and second surfaces of extended area relative to the cross sectional thickness thereof, each layer being substantially continuous over its area, said layers being sandwiched together in parallel plane relationship with substantially the entire area of a surface of one layer in intimate contact with a substantial area of a surface of an adjacent layer;

first and second ones of said layers being photoconductive;

a third one of said layers comprising a film of optically opaque electrically conductive material, said third layer sandwiched between the second surface of said first layer and the first surface of said second layer and in electrical contact with said first and second layers over said extended areas thereof; and fourth and fifth ones of said layers each comprising a thin conductive transparent film, said film of said fourth layer disposed adjacent the first surface of said first layer and in electrical contact therewith over said extended area thereof, and said film of said fifth layer disposed adjacent the second surface of said second layer and in electrical contact therewith over said extended area thereof;

said fourth layer being sufficiently thin to transmit a first light image directed thereto to activate said first layer, said fifth layer being sufficiently thin to transmit a second light image directed thereto to activate said second layer, said third layer blocking said first image from said second layer and blocking said second image from said first layer, said fourth and fifth layers adapted to be connected to a source of electrical potential and current measuring means for providing a measure of current flow through said plurality of layers as an indication of the correlation between said first and second images.

* * * * *